UNITED STATES PATENT OFFICE.

THOMAS B. McKINSTRY, OF PORTLAND, OREGON.

IMPROVEMENT IN PAINTS AND ROOFING COMPOUNDS.

Specification forming part of Letters Patent No. 221,841, dated November 18, 1879; application filed July 1, 1879.

*To all whom it may concern:*

Be it known that I, THOMAS B. MCKINSTRY, of Portland, in the county of Multnomah and State of Oregon, have invented certain new and useful Improvements in Paints and Roofing Compounds; and I do hereby declare the following to be a full, clear, and exact description of the invention, such as will enable others skilled in the art to which it pertains to make and use it, reference being had to the accompanying drawings, which form part of this specification.

My invention relates to an improvement in fire-proof elastic paints to be used on roofs, both tin and shingle, brick walls, boats, cars, and other such places; and it consists in compounding together the ingredients hereinafter named, for the purpose of making a paint which will expand and contract with the surface on which it is placed without breaking, and which is as fire-proof as a paint can be made.

In making my paint I take the following ingredients in or about the proportions given below: Portland cement, one and one-half pound; metallic or fire-proof paint, one-half pound; hard-wood ashes, one-quarter pound; best white lead, one-half pound; fresh slaked lime, one-quarter pound; very fine clean sand, one-quarter pound; boiled linseed-oil, sufficient quantity. The sand and cement are to be finely ground before being mixed with the other parts.

This paint, when applied to leaky roofs, will stop up all joints and make them perfectly tight, and will water-proof any surface to which it is applied, as well as make it proof against fire as far as a paint can be made fire-proof.

When the paint is to be applied to new tin, the tin should be first swept clean, and if to old tin on which the paint is scaling off, the tin should first be cleaned with a scraper.

Having thus described my invention, I claim—

A paint or roofing compound composed of Portland cement, metallic paint, hard-wood ashes, white lead, lime, sand, and linseed-oil, in or about in the proportions set forth.

In testimony that I claim the foregoing I have hereunto set my hand this 16th day of June, 1879.

THOS. B. McKINSTRY.

Witnesses:
P. LEONARD,
J. C. STUART.